United States Patent
Berr et al.

(10) Patent No.: US 10,077,738 B2
(45) Date of Patent: *Sep. 18, 2018

(54) METHOD FOR PRODUCING A PISTON FOR AN INTERNAL COMBUSTION ENGINE AND PISTON PRODUCED BY SAID METHOD

(71) Applicant: Mahle International GmbH, Stuttgart (DE)

(72) Inventors: Gerhard Berr, Aspach (DE); Sascha-Oliver Boczek, Dielheim (DE); Reiner Mueller, Rottweil (DE); Rainer Scharp, Vaihingen (DE)

(73) Assignee: Mahle International GmbH (DE)

( * ) Notice: Subject to any disclaimer, the term of this patent is extended or adjusted under 35 U.S.C. 154(b) by 189 days.

This patent is subject to a terminal disclaimer.

(21) Appl. No.: 14/778,076

(22) PCT Filed: Mar. 18, 2014

(86) PCT No.: PCT/DE2014/000138
§ 371 (c)(1),
(2) Date: Sep. 17, 2015

(87) PCT Pub. No.: WO2014/146636
PCT Pub. Date: Sep. 25, 2014

(65) Prior Publication Data
US 2016/0281637 A1    Sep. 29, 2016

(30) Foreign Application Priority Data

Mar. 18, 2013  (DE) .................. 10 2013 004 575
Aug. 28, 2013  (DE) .................. 10 2013 014 345

(51) Int. Cl.
*B21K 1/18*    (2006.01)
*F02F 3/28*    (2006.01)
(Continued)

(52) U.S. Cl.
CPC ............... *F02F 3/28* (2013.01); *B21K 1/185* (2013.01); *B23K 15/0053* (2013.01);
(Continued)

(58) Field of Classification Search
CPC ............... F02F 3/003; F02F 2003/0061; F02F 2200/04; F02F 2200/06; B21K 1/18; B21K 1/185; B23K 2201/003; B23P 15/10
See application file for complete search history.

(56) References Cited

U.S. PATENT DOCUMENTS 3,807,014 A    4/1974    Hummel
8,528,206 B2   9/2013    Scharp et al.
(Continued)

FOREIGN PATENT DOCUMENTS

DE    2124595 A1    11/1972
DE    3040572 A1    5/1982
(Continued)

OTHER PUBLICATIONS

English abstract for DE-3040572.
(Continued)

*Primary Examiner* — Christopher Besler
(74) *Attorney, Agent, or Firm* — Fishman Stewart PLLC

(57) ABSTRACT

A method for producing a piston for an internal combustion engine may include the steps of: producing a piston main body from a first blank via a deformation process; producing a piston ring part from a second blank via at least one of a deformation process and a casting process; pre-machining the first blank and the second blank, and finish machining a welding surface of the first blank and a welding surface of the second blank; connecting the pre-machined first blank and the pre-machined second blank via a welding process to form a piston body; and performing at least one of a
(Continued)

secondary machining and a finish machining of the piston body to produce the piston.

19 Claims, 4 Drawing Sheets

(51) Int. Cl.
| | |
|---|---|
| *B23P 15/10* | (2006.01) |
| *F02F 3/00* | (2006.01) |
| *B23K 15/00* | (2006.01) |
| *B23K 26/32* | (2014.01) |
| *B23K 26/282* | (2014.01) |
| *B23K 101/00* | (2006.01) |
| *B23K 103/04* | (2006.01) |
| *F02F 3/22* | (2006.01) |
| *B23K 103/00* | (2006.01) |

(52) U.S. Cl.
CPC ........ *B23K 15/0093* (2013.01); *B23K 26/282* (2015.10); *B23K 26/32* (2013.01); *B23P 15/10* (2013.01); *F02F 3/003* (2013.01); *B21K 1/18* (2013.01); *B23B 2215/245* (2013.01); *B23K 2201/003* (2013.01); *B23K 2203/04* (2013.01); *B23K 2203/50* (2015.10); *F02F 3/22* (2013.01); *F02F 2003/0061* (2013.01); *F02F 2200/04* (2013.01)

(56) References Cited

U.S. PATENT DOCUMENTS

| | | | |
|---|---|---|---|
| 8,943,687 | B2 | 2/2015 | Scharp et al. |
| 2010/0037765 | A1 | 2/2010 | Gniesmer et al. |
| 2012/0037111 | A1* | 2/2012 | Scharp ................ B23K 20/129 |
| | | | 123/193.6 |
| 2012/0080004 | A1 | 4/2012 | Menezes et al. |
| 2012/0222305 | A1 | 9/2012 | Scharp et al. |
| 2012/0260882 | A1* | 10/2012 | Martins .................... B23B 1/00 |
| | | | 123/193.6 |

FOREIGN PATENT DOCUMENTS

| | | |
|---|---|---|
| DE | 102005034306 A1 | 5/2006 |
| DE | 102008063947 A1 | 7/2010 |
| DE | 102011100521 A | 2/2012 |
| DE | 102011013067 A1 | 9/2012 |
| DE | 102011013141 A1 | 9/2012 |
| JP | S61210220 A | 9/1986 |
| WO | WO-2012019595 A2 | 2/2012 |
| WO | WO-2012142433 A1 | 10/2012 |

OTHER PUBLICATIONS

English abstract for DE-102008063947.
English abstract for DE-102011100521.
German Search Report for DE-102013014345.4, dated Dec. 11, 2013.
Japanese Office Action dated Sep. 5, 2017 related to corresponding Japanese Patent Application No. 2016-503541.

* cited by examiner ically not to the invention relates to a method for producing a piston for an internal combustion engine, having a piston main body and a piston ring part, wherein the piston main body has a combustion depression with a dome and has piston bosses equipped with boss bores, which piston bosses are connected to one another by way of running surfaces, wherein the piston ring section has a piston crown, an encircling fire land and an encircling ring section, and wherein the piston main body and the piston ring section form an encircling cooling duct. The present invention also relates to a piston that can be produced by way of said method.

METHOD FOR PRODUCING A PISTON FOR AN INTERNAL COMBUSTION ENGINE AND PISTON PRODUCED BY SAID METHOD

CROSS-REFERENCE TO RELATED APPLICATIONS

This application claims priority to German Patent Application No. DE 102013004575.4, filed Mar. 18, 2013, German Patent Application No. 102013014345.4, filed Aug. 28, 2013, and International Patent Application No. PCT/DE2014/000138, filed Mar. 18, 2014, all of which are hereby incorporated by reference in their entirety.

TECHNICAL FIELD

The present invention relates to a method for producing a piston for an internal combustion engine, having a piston main body and a piston ring part, wherein the piston main body has a combustion depression with a dome and has piston bosses equipped with boss bores, which piston bosses are connected to one another by way of running surfaces, wherein the piston ring section has a piston crown, an encircling fire land and an encircling ring section, and wherein the piston main body and the piston ring section form an encircling cooling duct. The present invention also relates to a piston that can be produced by way of said method.

BACKGROUND

A method for producing a piston is known from the German patent applications 10 2011 013 141 A1 and DE 10 2011 013 067 A1, in which method the blank of the piston main body is finished by forging in the entire region of the combustion depression. The contour of the combustion depression is thus not involved in the secondary machining process.

It has however been found that the local heating of the piston body during the welding of the blanks results in a change in the microstructure and the dissipation of stresses in the material, which have the effect that the geometry and thus the volume of the combustion depression change. Therefore, the volume of the combustion depression in the finished piston may deviate considerably from the predefined values. Since the combustion depression is finished by forging, additional cutting machining is no longer possible. This applies in particular to combustion depressions with complex geometries.

SUMMARY

It is the object of the present invention to further develop a generic method such that, in as simple a manner as possible, the volume of the combustion depression in the finished piston lies within the predefined tolerance range even in the case of complex geometries.

The solution consists in that, in step a), during the production of the blank of the piston main body, the contour of the combustion depression outside a dome region is fully produced, excess material is formed in the dome region of the combustion depression, and in that, in step e), such an amount of the excess material in the dome region of the combustion depression is removed as to result in a predetermined volume of the combustion depression.

The present invention also relates to a piston producible by way of the method according to the invention.

The method according to the invention is characterized in that, during the production of the piston main body by deformation processes, excess material is formed in the region of the dome of the combustion depression, whereas the remaining region of the combustion depression is fully produced, that is to say requires no further secondary machining. Through the removal of a particular amount of the excess material, the predetermined volume of the combustion depression can be accurately set after the welding of the blanks, without the need to manipulate the geometry of the combustion depression outside the region of the dome.

Advantageous refinements will emerge from the subclaims.

A refinement of the method according to the invention provides that, in step e), for the inspection of the volume of the combustion depression, during the removal of the excess material in the dome region, the present lowest point of the combustion depression 5 is detected, and a plane running perpendicularly to the piston central axis is applied to said lowest point, said plane being used as a starting point for the finish machining of the piston crown.

It is expediently provided that, in step c), cooling duct regions are formed into the blanks and/or are finish-machined, because the cooling duct regions are no longer accessible after the welding of the blanks.

It is furthermore advantageous if, in step c), in the blank of the piston main body, the interior space is finish-machined and inlet and outlet openings for cooling oil are formed into the cooling duct region.

The piston main body is easier to handle for this purpose than the welded piston body.

Furthermore, based on the same considerations, it is recommended that, in step c), on the blank of the piston main body and/or of the piston ring part, the outer diameter be pre-machined, and/or, on the blank of the piston ring part, the piston crown be pre-machined, and/or, on the blank of the piston main body, the piston bosses be pre-machined.

A preferred refinement provides that, in step e), the boss bores are formed into the piston bosses after the piston crown has been finish-machined. Since the compression high of a piston is defined by the distance between the piston crown and central axis of the boss bore, the predetermined compression height of the finished piston can be obtained in a particularly simple manner.

Various deformation methods may be selected for the production of the blank of the piston main body. The blank may be forged by hot working at 1200° C. to 1300° C. and subsequently subjected to cold calibration. The blank may also be forged by hot working at 1200° C. to 1300° C. and subsequently subjected to cold working at a temperature of at most 150° C. The blank may furthermore be forged by warm working at 600° C. to 900° C. Furthermore, the blank may, after the warm working, be subjected to cold working at a temperature of at most 150° C. Finally, the blank may be forged by cold working at at most 150° C.

BRIEF DESCRIPTION OF THE DRAWINGS

Exemplary embodiments of the present invention will be discussed in more detail below on the basis of the appended drawings in which, in each case in a schematic illustration which is not to scale.

DETAILED DESCRIPTION

Figure 1:
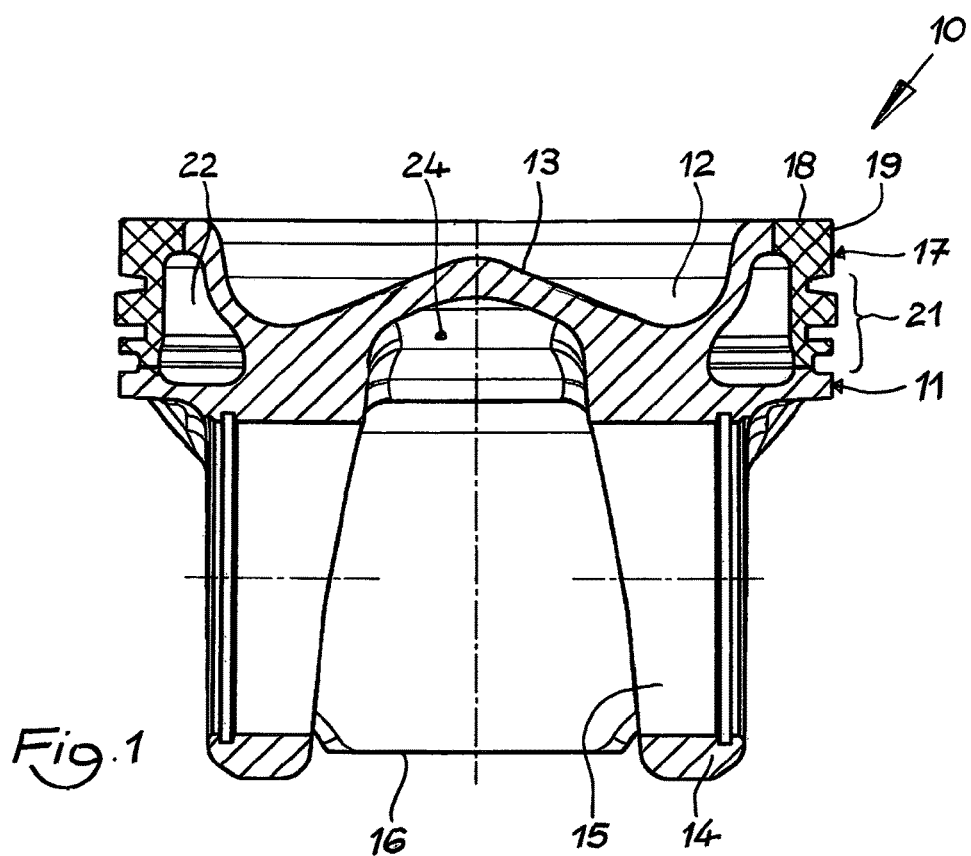
FIG. 1 shows an exemplary embodiment of a piston produced by way of the method according to the invention.

FIG. 1 shows an exemplary embodiment of a piston 10 according to the invention. The piston has a piston main body 11 with combustion depression 12 equipped with a central dome 13. The piston main body 11 furthermore has, in a manner known per se, piston bosses 14 with boss bores 15 for receiving a piston pin (not illustrated), and an interior space 24. The piston bosses 14 are connected to one another by way of running surfaces 16.

The piston 10 furthermore has a piston ring part 17 with a piston crown 18, with an encircling fire land 19 and with an encircling ring section 21 with annular grooves for receiving piston rings (not illustrated). An encircling cooling duct 22 with inlet and outlet openings for cooling oil (not illustrated) is provided at the level of the ring section 21.

In the present exemplary embodiment, the piston main body 11 and the piston ring part 17 are connected to one another by way of a welding process, for example electron beam welding or laser welding.

The piston main body 11 is produced from a material which can be subjected to a deformation process. This is typically a tempering steel, for example 42CrMo4 or an AFP steel such as 38MnVS6.

According to the invention, it is the intention to produce a piston 10 whose combustion depression 12 has a volume within a predetermined tolerance range. It is the intention to achieve this aim regardless of the geometry of the combustion depression, such that even a combustion depression of complex geometry has a volume within the predetermined tolerance range after the completion of the production process. It is the intention that, by means of the method according to the invention, the aim according to the invention can be achieved even for combustion depressions which are radially offset with respect to the piston central axis or which are in an inclined arrangement.

Figure 2:
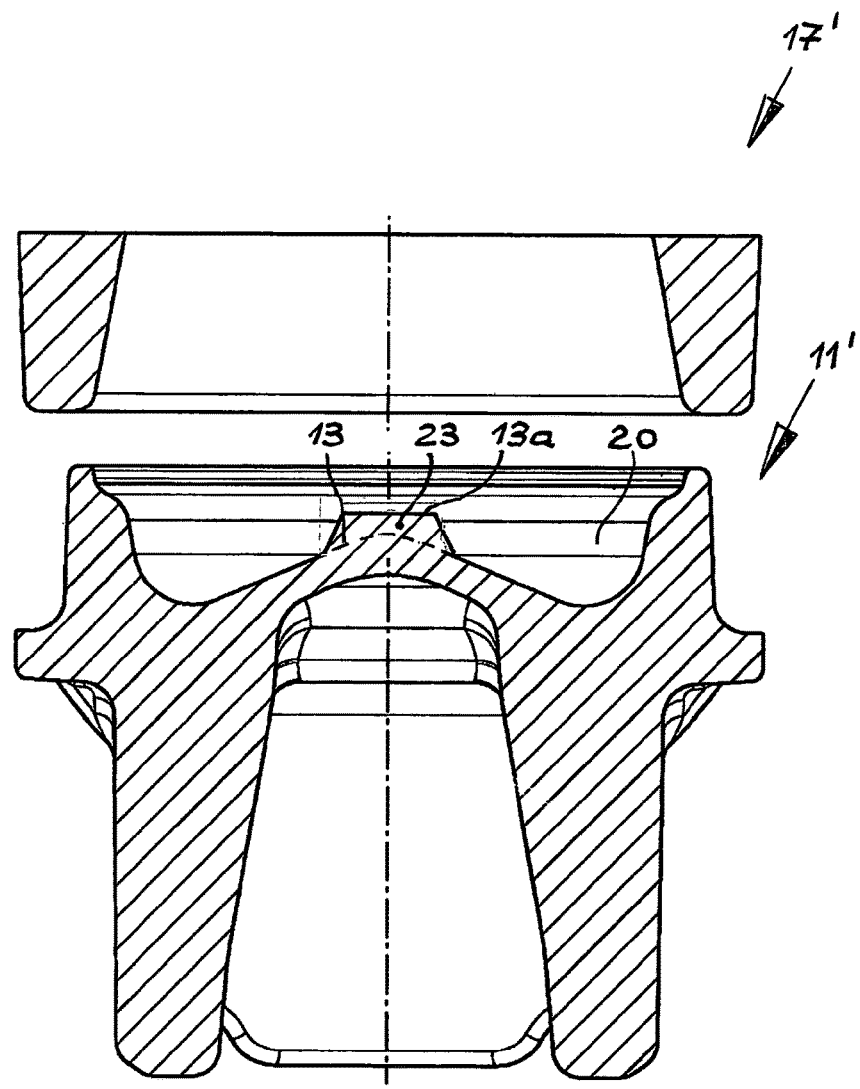
FIG. 2 shows a first exemplary embodiment of in each case one blank of a piston main body and of a piston ring part for a piston as per FIG. 1.

For this purpose, as illustrated in FIG. 2, it is firstly the case that blanks for the piston main body 11 and the piston ring part 17 are produced. The blank 11' for the piston main body 11 has, in the exemplary embodiment, been further processed by way of hot forming at 1200° to 1300° and subsequent cold calibration (pressing of the surfaces of the blank 11' at room temperature).

In the exemplary embodiment, the geometry of the combustion depression 12, with the exception of the dome region 13a around the dome 13, is finished by forging. This means that, for the production of the finished piston 10, no secondary machining of the combustion depression 12 is necessary, other than in the dome region 13a.

It is essential that, after the forging process, the dome region 13a has an adequate amount of excess material 23 in order that the volume of the combustion depression 12 can be accurately set in accordance with the invention (in this regard, see further below).

A blank 17' of the piston ring part 17 may be produced from any suitable material, for example by deformation or casting.

Figure 3:
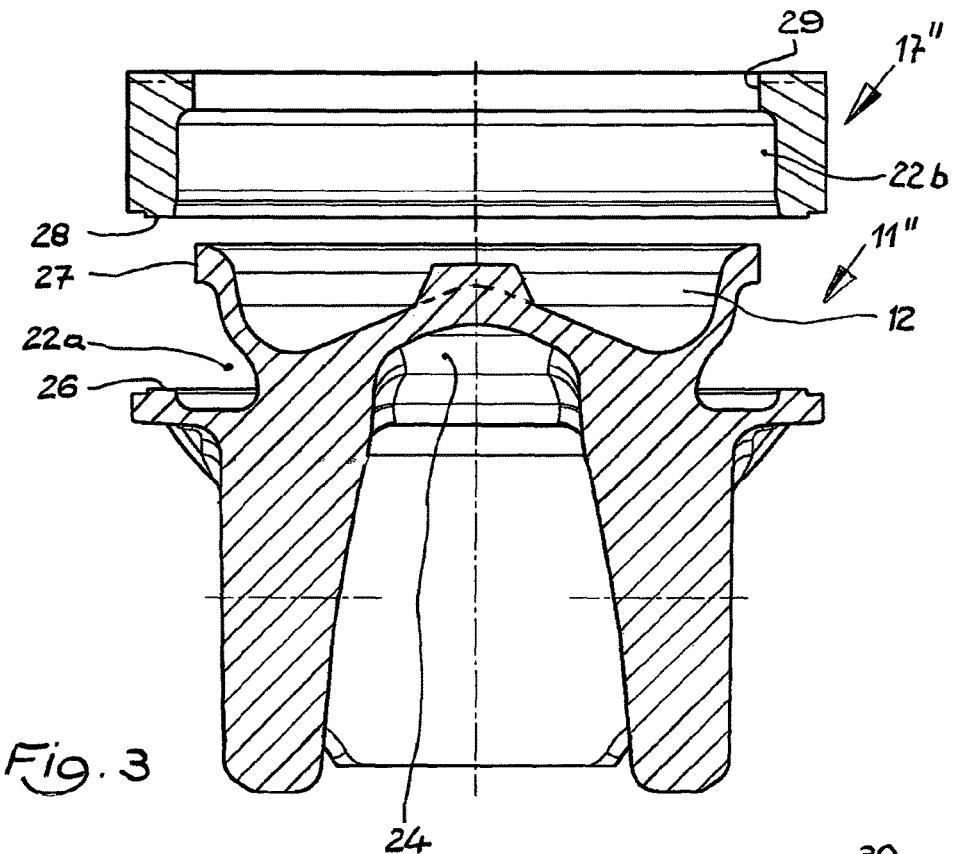
FIG. 3 shows the blanks as per FIG. 2 after pre machining has been performed.

As illustrated in FIG. 3, it is possible, after the forging process, for the blanks 11', 17' to be pre-machined to form machined blanks 11", 17". On both blanks 11', 17', it is for example possible for the outer diameter to be pre-machined.

On the blank 11' for the piston main body 11, it is also possible for the boss region to be pre-machined. Finally, the interior space 24 can be finish-machined. Furthermore, a cooling duct region 22a, which in the finished piston 10 forms a part of the cooling duct 22, is formed into the blank 11'. The cooling duct region 22a may also be formed in during the forging process, and in this case is finish-machined after the forging process. The inlet and outlet openings for cooling oil are formed into the cooling duct region 22a.

On the blank 17' for the piston ring part 17, it is for example the case that a cooling duct region 22b, which in the finished piston 10 forms a part of the cooling duct 22, is formed into the blank 17'.

Finally, after the forging process, in both blanks 11', 17', the welding surfaces 26, 27 and 28, 29, respectively, by way of which the blanks 11', 17' are to be connected to one another, are finish-machined.

Figure 4:
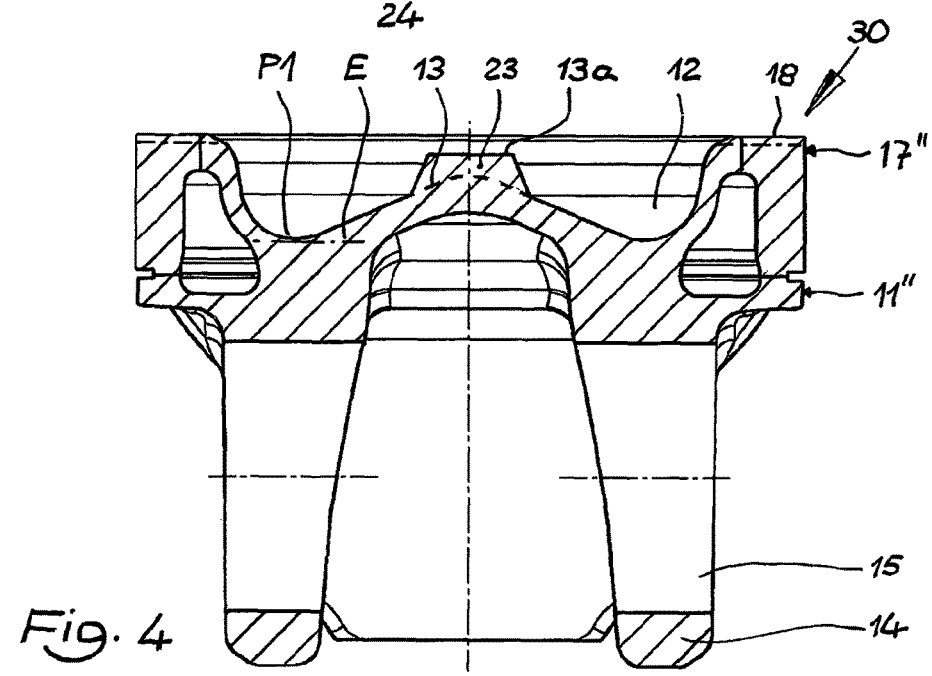
FIG. 4 shows a welded piston body formed from the pre-machined blanks as per FIG. 3.

Then, the blanks 11", 17" are, by way of their welding surfaces 26 and 28, and 27 and 29, respectively, connected to one another in a manner known per se by way of a suitable welding process to form a piston body 30, such as is illustrated in FIG. 4. In this case, the welding process leads to local heating of the material in the region of the welding surfaces 26 and 28, and 27 and 29, respectively. Said local heating effects a change in the microstructure, and the dissipation of stresses, in the material. This generally has the effect that the geometry and thus the volume of the combustion depression 12 then deviate considerably from the values predefined for the finished piston 10.

Then, in a subsequent method step, on the piston body 30 that results from the welding process, the dome region 13a is finish-machined by virtue of the excess material 23 being removed. This is performed to such an extent that, as a result, the predetermined volume of the piston depression 12 is accurately set after the welding of the blanks 11", 17", without the need to manipulate the geometry of the combustion depression 11 outside the dome region 13a. The remaining region of the combustion depression 12 has already been fully produced by way of the deformation process, that is to say requires no further secondary machining.

Since it is only after the removal of the excess material 23 in the dome region 13a that the piston crown 18 is finish-machined, it is the case that, for the inspection of the volume of the combustion depression 12, during the removal of the excess material 23 in the dome region 13a, the present lowest point P1 of the combustion depression 12 is detected, and a plane E running perpendicular to the piston central axis is applied to said lowest point, said plane being used as a starting point for the finish machining of the piston crown 18.

To complete the method according to the invention, the piston body 30 is finish-machined by virtue, for example, of the final fine contour being produced and the annular grooves being formed into the ring section 21 and the boss bores 15 being formed into the piston bosses 14. The boss bores 15 are formed in such that the predetermined compression height of the finished piston is determined by the central axis of said boss bores in relation to the piston crown 18. A piston as per FIG. 1 is obtained as a result.

Figure 5:
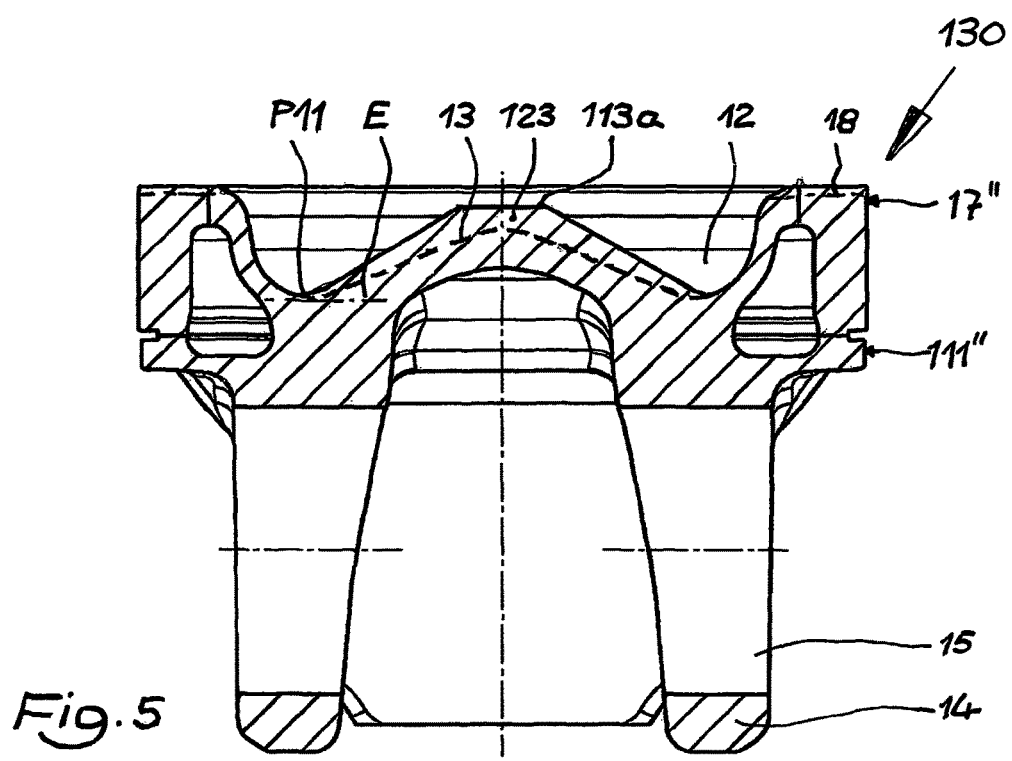
FIG. 5 shows an exemplary embodiment of a welded piston body with a further embodiment of a pre-machined blank for the piston lower part.

FIG. 5 shows a piston body 130 composed of a machined blank 17" for the piston ring part 17 as per the first exemplary embodiment according to FIGS. 1 to 4 and of a machined blank 111' for the piston main body 11, which machined blank differs from the blank 11' as per the first exemplary embodiment according to FIGS. 1 to 4. The same reference signs are used for common structures of the two exemplary embodiments of the piston body 30, 130, and in this regard, reference is made to the description relating to FIGS. 1 to 4.

The machined blank 111" for the piston main body 11 is produced in the manner described for the exemplary embodiment as per FIGS. 1 to 4. The connection of the machined blanks 111", 17" is performed in the manner described for the exemplary embodiment as per FIGS. 1 to 4.

In this exemplary embodiment, too, the geometry of the combustion depression 12, with the exception of the dome region 113a, is finished by forging. The main difference in relation to the exemplary embodiment as per FIGS. 1 to 4 consists in that the dome region 113a extends from the tip of the dome 13 to the lowest point P11 of the combustion depression 13. This means that, for the production of the finished piston 10, no secondary machining of the combustion depression 12 is necessary, other than in the dome region 113a.

In this exemplary embodiment, too, on the piston body 130 that results from the welding process, the dome region 113a is finish-machined by virtue of the excess material 123 being removed. This is performed to such an extent that, as a result, the predetermined volume of the combustion depression 12 is accurately set after the welding of the blanks 111", 17", without the need to manipulate the geometry of the combustion depression 11 outside the dome region 113a. The remaining region of the combustion depression 12 has already been fully produced by way of the deformation process, that is to say requires no further secondary machining.

Since it is only after the removal of the excess material 123 in the dome region 113a that the piston crown 18 is finish-machined, it is the case that, for the inspection of the volume of the combustion depression 12, during the removal of the excess material 123 in the dome region 113a, the present lowest point P11 of the combustion depression 12 is detected, and a plane E running perpendicularly to the piston central axis is applied to said lowest point, aid plane being used as a starting point for the finish machining of the piston crown 18.

To complete the method according to the invention, the piston body 130 is finish-machined as has been described for the exemplary embodiment as per FIGS. 1 to 4. A piston as per FIG. 1 is obtained as a result.

The invention claimed is:

1. A method for producing a piston for an internal combustion engine, comprising the steps of:
   a) producing a first blank of a piston main body via a deformation process, wherein producing the first blank includes forming a contour of a combustion depression outside of a dome region of the piston main body to completion where an excess material deposit is defined in the dome region of the combustion depression, the piston main body including a plurality of piston bosses together defining at least two boss bores, the plurality of piston bosses connected to one another via a running surface, and wherein the combustion depression includes a welding surface facing radially towards an outside with respect to a piston central axis;
   b) producing a second blank of a piston ring part via at least one of a deformation process and a casting process, wherein the piston ring part includes a piston crown, an annular fire land and an annular ring section, and wherein the piston crown has a welding surface facing radially towards an inside with respect to the piston central axis;
   c) pre-machining the first blank and the second blank, and finish machining the welding surface of the combustion depression and the piston crown;
   d) connecting the pre-machined first blank of piston main body and the pre-machined second blank of the piston ring part via a welding process to form a piston body, wherein the piston main body and the piston ring part together define an annular cooling duct; and
   e) performing at least one of a secondary machining and a finish machining of the piston body to produce the piston;
   wherein step e) further includes removing an amount of the excess material deposit in the dome region of the combustion depression to define a predetermined volume of the combustion depression and inspecting the predetermined volume during the removal of the excess material deposit in the dome region, wherein inspecting the predetermined volume includes determining a lowest point of the combustion depression, and establishing a starting point for a finish machining of the piston crown based on a plane running perpendicularly to the piston central axis and extending through the lowest point.

2. The method as claimed in claim 1, wherein step c) further includes forming a first cooling duct region into the first blank and forming a second cooling duct region into the second blank.

3. The method as claimed in claim 1, wherein step c) further includes finish machining an interior space defined in the first blank of the piston main body and forming an inlet opening and an outlet opening for a cooling fluid into a cooling duct region of the first blank.

4. The method as claimed in claim 1, wherein step c) further includes pre-machining an outer diameter of at least one of the first blank of the piston main body and the second blank of the piston ring part.

5. The method as claimed in claim 1, wherein step e) further includes forming the at least two boss bores into the plurality piston bosses after performing the finish machining of at least the piston crown.

6. The method as claimed in claim 1, wherein step a) further includes forging the first blank of the piston main body via hot working at a temperature ranging from 1200° C. to 1300° C. and subsequently performing a cold calibration process to the first blank.

7. The method as claimed in claim 1, wherein step a) further includes forging the first blank of the piston main body via hot working at a temperature ranging from 1200° C. to 1300° C. and subsequently cold working the first blank at a temperature of 150° C. or less.

8. The method as claimed in claim 1, wherein step a) further includes forging the first blank of the piston main body via working at a predetermined temperature.

9. The method as claimed in claim 8, further comprising cold working the first blank of the piston main body at a temperature of 150° C. or less after forging the first blank.

10. The method as claimed in claim 1, wherein step a) further includes forging the first blank of the piston main body via cold working at a temperature of 150° C. or less.

11. The method as claimed in claim 1, wherein step c) further includes at least one of pre-machining and finish machining the piston crown on the second blank of the piston ring part.

12. The method as claimed in claim 1, wherein step c) further includes pre-machining the plurality of piston bosses on the first blank of the piston main body.

13. The method as claimed in claim 2, wherein step c) further includes performing a finish machining on at least one of the first cooling duct region and the second cooling duct region.

14. The method as claimed in claim 1, wherein step e) of removing the amount of excess material deposit in the dome region includes providing the combustion depression with a defined geometry.

15. The method as claimed in claim 8, wherein the predetermined temperature ranges from 600° C. to 900° C.

16. The method of claim 1, wherein the annular fire land includes at least one annular groove configured to receive a first piston ring and the annular ring section includes at least one annular groove configured to receive at least one second piston ring.

17. A method for producing a piston for an internal combustion engine, comprising:
   a) deforming a first blank of a piston main body including a combustion depression having a dome, a plurality of piston bosses together defining at least two boss bores, a running surface connecting the plurality of piston bosses to one another, wherein the combustion depression has a welding surface facing radially towards an outside with respect to a piston central axis;
   b) deforming or casting a second blank of a piston ring part including a piston crown, an annular fire land and an annular ring section, wherein the piston crown has a welding surface facing radially towards an inside with respect to the piston central axis;
   c) pre-machining the first blank and the second blank, and finish machining the welding surface of the combustion depression and of the piston crown;
   d) connecting the pre-machined first blank of piston main body and the pre-machined second blank of the piston ring part via a welding process to form a piston body, wherein the piston main body and the piston ring part together define an annular cooling duct; and
   e) performing at least one of a secondary machining and a finish machining of the piston body to produce the piston;
   wherein step a) includes forming a contour of the combustion depression for the piston outside of a dome region to completion where an excess material deposit is defined in the dome region, and wherein step e) further includes removing an amount of the excess material deposit in the dome region to provide a predetermined volume of the combustion depression without performing at least one of a secondary machining and a finish machining on the contour outside of the dome region.

18. The method as claimed in claim 14, wherein providing the combustion depression with the defined geometry includes forming the combustion depression radially offset with respect to the piston central axis.

19. The method as claimed in claim 14, wherein providing the combustion depression with the defined geometry includes forming the combustion depression inclined with respect to the piston central axis.

* * * * *